(12) United States Patent
Hosoda (10) Patent No.: US 10,642,548 B2
(45) Date of Patent: May 5, 2020

(54) PRINTING APPARATUS AND CONTROL METHOD OF PRINTING APPARATUS

(71) Applicant: CANON KABUSHIKI KAISHA, Tokyo (JP)

(72) Inventor: Yasuhiro Hosoda, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/350,821

(22) Filed: Nov. 14, 2016

(65) Prior Publication Data

US 2017/0139654 A1 May 18, 2017

(30) Foreign Application Priority Data

Nov. 18, 2015 (JP) ................................. 2015-225806

(51) Int. Cl.
*G06F 15/00* (2006.01)
*G06F 3/12* (2006.01)

(52) U.S. Cl.
CPC .......... *G06F 3/1236* (2013.01); *G06F 3/1206* (2013.01); *G06F 3/1222* (2013.01); *G06F 3/1238* (2013.01); *G06F 3/1286* (2013.01); *G06F 3/1292* (2013.01)

(58) Field of Classification Search
CPC .... G06F 3/1236; G06F 3/1206; G06F 3/1222; G06F 3/1238; G06F 3/1286; G06F 3/1292
USPC ........................................ 358/1.15
See application file for complete search history.

(56) References Cited

U.S. PATENT DOCUMENTS

| 9,075,550 B2 | 7/2015 | Kakutani |
| 2013/0329253 A1 | 12/2013 | Sasaki |
| 2014/0213190 A1 | 7/2014 | Yamaoka |
| 2015/0093992 A1* | 4/2015 | Tanaka ................. H04B 5/0031 455/41.2 |
| 2015/0116746 A1* | 4/2015 | Park ...................... G06F 3/1263 358/1.13 |
| 2015/0268904 A1 | 9/2015 | Inoue |
| 2015/0355875 A1 | 12/2015 | Matsushita |
| 2016/0062717 A1 | 3/2016 | Kawasaki |

FOREIGN PATENT DOCUMENTS

| CN | 1417676 A | 5/2003 |
| CN | 104252323 A | 12/2014 |
| CN | 104461410 A | 3/2015 |
| CN | 104754171 A | 7/2015 |
| CN | 104951255 A | 9/2015 |
| JP | 2011-198166 A | 10/2011 |
| JP | 2013-111867 A | 6/2013 |
| JP | 2014-179926 A | 9/2014 |
| JP | 2014-216879 A | 11/2014 |
| JP | 2015-070518 A | 4/2015 |
| KR | 10-2006-0122522 A | 11/2006 |
| KR | 10-1249185 B1 | 4/2013 |
| KR | 10-2015-0050100 A | 5/2015 |

* cited by examiner

*Primary Examiner* — Mark R Milia
(74) *Attorney, Agent, or Firm* — Canon U.S.A., Inc. IP Division (57) ABSTRACT

In a case where a printing apparatus receives print data using wireless communication in an access point mode, a user having input an instruction for starting operation in the access point mode is determined as a job owner.

21 Claims, 11 Drawing Sheets

320 WIRELESS CONNECTION SCREEN

FIG. 3D

330 WIRELESS CONNECTION SCREEN

```
PRINT HISTORY

PRINT JOB ID:0001
PRINT RESULT: OK

PRINT START TIME :2015/10/10 12:05
PRINT END TIME :2015/10/10 12:06

JOB OWNER :Mobile  ~601

NUMBER OF PRINTS: 20 SHEETS
```

600 PRINT HISTORY SCREEN

FIG. 6B

```
PRINT HISTORY

PRINT JOB ID:0001
PRINT RESULT: OK

PRINT START TIME :2015/10/10 12:05
PRINT END TIME :2015/10/10 12:06

JOB OWNER :Yamada ~611

NUMBER OF PRINTS: 20 SHEETS
```

610 PRINT HISTORY SCREEN

FIG. 7A
PRIOR ART

HOLD PRINTING

SELECT PRINT DATA TO BE PRINTED,
AND PRESS PRINT BUTTON.

| ID | FILE NAME | JOB OWNER |
|---|---|---|
| 001 | CONFERENCE MATERIAL | Tanaka |
| 002 | MANUAL | Sato |
| 003 | Photo.001 | Mobile |

[ PRINT ]   701

700 HOLD PRINTING SCREEN

FIG. 7B

HOLD PRINTING

SELECT PRINT DATA TO BE PRINTED,
AND PRESS PRINT BUTTON.

| ID | FILE NAME | JOB OWNER |
|---|---|---|
| 001 | CONFERENCE MATERIAL | Tanaka |
| 002 | MANUAL | Sato |
| 003 | Photo.001 | Yamada |

[ PRINT ]   711

710 HOLD PRINTING SCREEN

| USER | SSID |
|---|---|
| Yamada | Direct_2226_2966 |
| Sato | Direct_8219_1728 |
| Tanaka | Direct_1428_8172 |

900 SSID MANAGEMENT TABLE

PRINTING APPARATUS AND CONTROL METHOD OF PRINTING APPARATUS

BACKGROUND

Field

The present disclosure generally relates to a printing apparatus and a control method of the printing apparatus.

Description of the Related Art

It has been known that a printer driver is installed on a personal computer (PC), and print data (a print job) is transmitted from the PC to a printing apparatus using the printer driver. The owner of the print job is called a job owner. The printer driver adds user information, e.g., information about the user logged into the PC, indicating the job owner to the print data, and then transmits the print data to the printing apparatus. The printer driver acquires the user information from an operating system (OS) of the PC, and adds the user information acquired from the OS to the print data as the job owner. When receiving the print data including the user information, the printing apparatus can determine the job owner, based on the user information included in this print data.

In addition to a PC, a mobile terminal, such as a smartphone, can also transmit print data to the printing apparatus. The mobile terminal establishes wireless communication with the printing apparatus using a direct wireless function such as an access point mode and Wi-Fi Direct®, and then transmits the print data to the printing apparatus. Japanese Patent Application Laid-Open No. 2014-179926 discusses a configuration in which a printing apparatus stops a direct wireless function when printing is completed or when the printing apparatus transitions to a power saving state.

As described, user information about a user logged into a PC can be added to print data transmitted by the PC to the printing apparatus. The printing apparatus can then determine the job owner of the print data based on the received print data. However, user information about a user of a mobile terminal is not included in print data transmitted by the mobile terminal. Therefore, when receiving the print data from the mobile terminal, the printing apparatus cannot determine the job owner of the print data.

SUMMARY OF THE INVENTION

According to an aspect of the present invention, a printing apparatus includes a wireless local area network interface including a direct wireless function that directly executes wireless communication between the printing apparatus and an external apparatus, a memory, and a processor that executes instructions stored in the memory to receive an instruction for starting the direct wireless function from a user, and determine, in a case where the printing apparatus receives print data using wireless communication by the direct wireless function, a user having input an instruction for starting the direct wireless function as an owner of the print data.

Further features will become apparent from the following description of exemplary embodiments with reference to the attached drawings.

DESCRIPTION OF THE EMBODIMENTS

Exemplary embodiments will be described in detail below with reference to the drawings. The exemplary embodiments to be described below are not intended to limit the scope of the claimed invention, and not all combinations of features to be described in the exemplary embodiments are necessary for a solution to the issue.

A first exemplary embodiment will be described below. An overall view of a printing system will be described with reference to FIG. 1. A printing apparatus 100 is connected to a wired LAN by a LAN cable. A PC 101 is connected to the wired LAN, and the PC 101 transmits print data to the printing apparatus 100. The printing apparatus 100 executes a print process based on the received print data.

Figure 1:
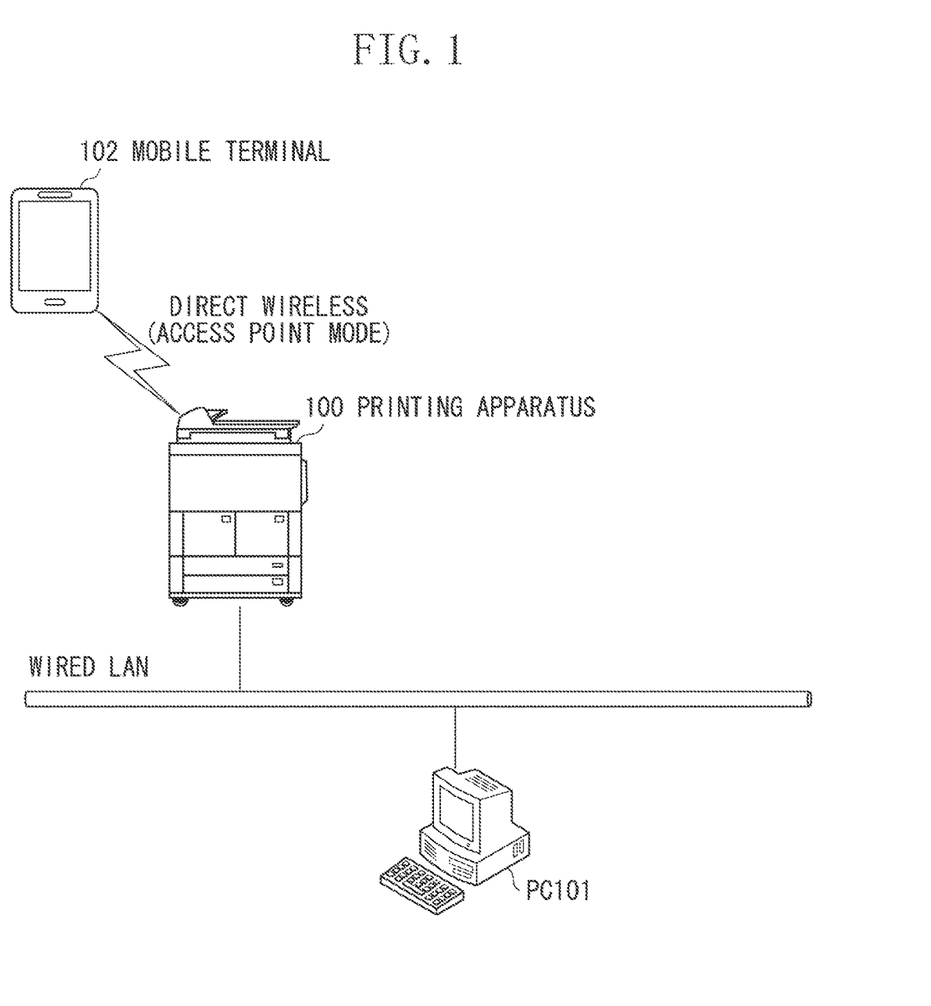
FIG. 1 is a diagram illustrating an overall view of a printing system.

The PC 101 adds user information to the print data to be transmitted. This user information indicates the job owner of the print data. The PC 101 acquires user information about a user logged in to the PC 101 from an OS of the PC 101, and adds the acquired user information to the print data. The printing apparatus 100 determines the job owner of the print data by referring to the user information added to the print data. The printing apparatus 100 can utilize the information about the determined job owner in various ways. For example, the printing apparatus 100 can determine whether to permit or prohibit execution of the print process according to authority of the job owner set beforehand in the printing apparatus 100. In another example, the printing apparatus 100 can keep a print history by using the name of the job owner upon completion of the print process.

The printing apparatus 100 also includes a wireless LAN function. Two kinds of wireless communication modes, infrastructure mode and access point mode, are each provided as the wireless LAN function of the printing apparatus 100. The infrastructure mode is a wireless communication mode in which the printing apparatus 100 wirelessly connects to an access point (not illustrated) to communicate with a device such as the PC 101 on a network.

The access point mode is a wireless communication mode in which the printing apparatus 100 itself acts as an access point by starting a software access point in the printing apparatus 100. A mobile terminal 102, such as a smartphone, wirelessly connects to the printing apparatus 100 operating in the access point mode, and transmits print data for printing an electronic file, such as a picture, to the printing apparatus 100. The access point mode can establish direct wireless communication between the printing apparatus 100 and the mobile terminal 102 without intervention of a relay apparatus, such as an access point. The access point mode is an example of a direct wireless communication mode for establishing direct wireless communication between the printing apparatus 100 and the mobile terminal 102. In place of the access point mode, another wireless communication system, such as Wi-Fi Direct®, can be applied to the present exemplary embodiment.

Typically, when the mobile terminal 102 transmits the print data to the printing apparatus 100, information added to the print data is model information of the mobile terminal 102 or a character string "Mobile". Therefore, when receiving the print data from the mobile terminal 102, the printing apparatus 100 cannot determine the job owner of the print data. The present exemplary embodiment provides a mechanism to enable a user providing an instruction for starting operation in the access point mode to be determined as a job owner.

Figure 2:
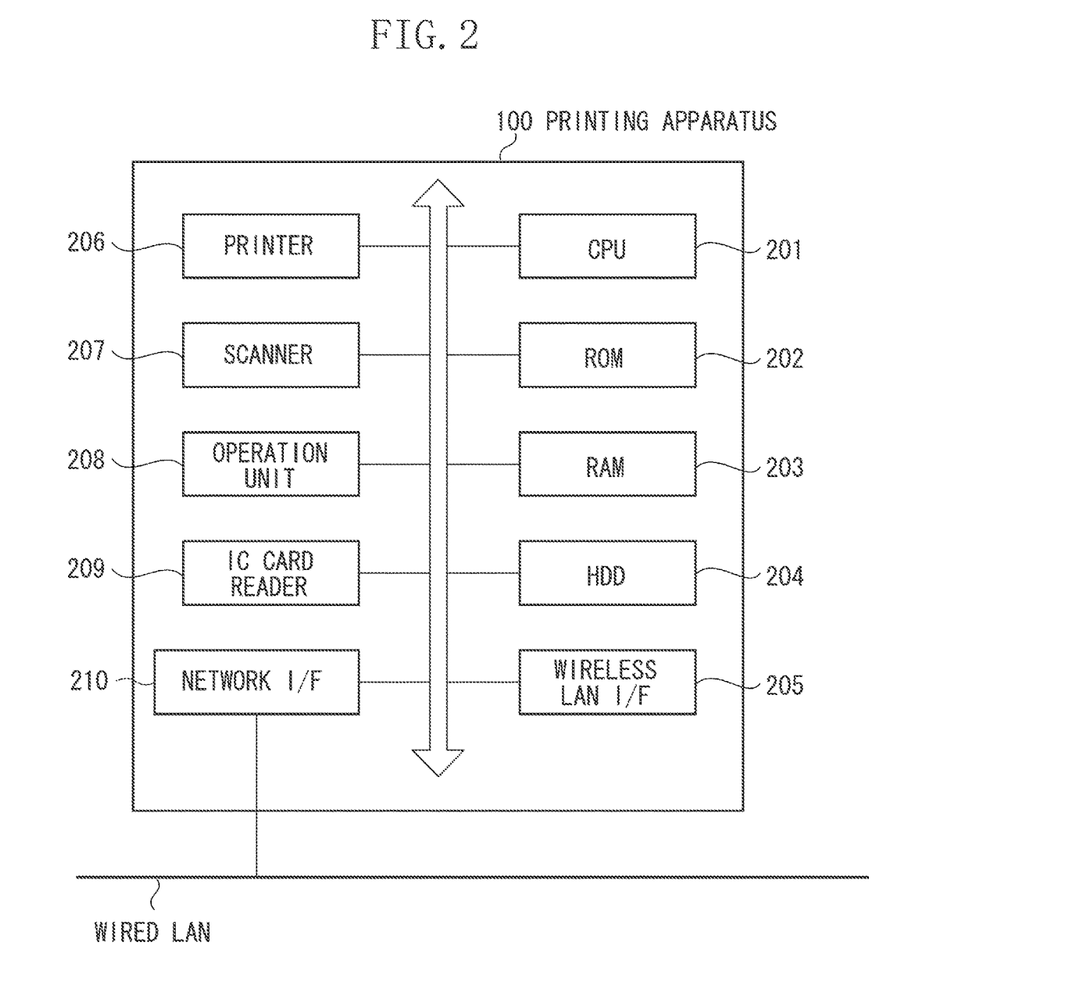
FIG. 2 is a diagram illustrating a hardware configuration of a printing apparatus.

A hardware configuration of the printing apparatus 100 will be described with reference to FIG. 2. A central processing unit (CPU) 201 reads out a control program stored in a read only memory (ROM) 202, and executes various kinds of processing for controlling operation of the printing apparatus 100. The ROM 202 stores the control program. A random access memory (RAM) 203 is used as a temporary storage area, such as a main memory, and a work area of the CPU 201. A hard disk drive (HDD) 204 is a nonvolatile storage medium for storing various kinds of data.

In the printing apparatus 100, one CPU 201 executes processing illustrated in each flowchart described below, but the configuration is not limited thereto. For example, the processing illustrated in the below-described flowcharts can also be executed by a plurality of CPUs operating together. In addition, a part of the processing described below can be executed using a hardware circuit such as an application specific integrated circuit (ASIC).

A wireless LAN I/F 205 executes wireless LAN communication with an external apparatus, such as the mobile terminal 102, and an access point. The wireless LAN communication executed by the wireless LAN I/F 205 is wireless communication such as Institute of Electrical and Electronics Engineers (IEEE) 802.11a/b/g/n/ac. The wireless LAN I/F 205 can operate in the infrastructure mode and the access point mode. The wireless LAN I/F 205 operates by selecting the infrastructure mode or the access point mode according to device setting performed beforehand.

A network I/F 210 connects to the wired LAN via a LAN cable. The network I/F 210 can communicate with an external apparatus (e.g., a PC) on the wired LAN.

A printer 206 executes a print process on a sheet based on the print data received by the wireless LAN I/F 205 or the network I/F 210. A scanner 207 generates an original document image by reading an original document placed by a user. The original document image generated by the scanner 207 is printed by the printer 206 or stored in the HDD 204.

An operation unit 208 includes a liquid crystal display unit including a touch panel function and a keyboard, and displays various operation screens. The user can input instructions and information into the printing apparatus 100 via the operation unit 208.

An integrated circuit (IC) card reader 209 reads user information (e.g., a user ID) from an IC card. Based on the user information read by the IC card reader 209, the printing apparatus 100 executes an authentication process.

When the user of the mobile terminal 102 desires to print, for example, a picture stored in the mobile terminal 102, the user uses the access point mode to directly connects the mobile terminal 102 to the printing apparatus 100 wirelessly. This operation procedure will be described with reference to FIGS. 3A, 3B, 3C, and 3D.

Figure 3A:
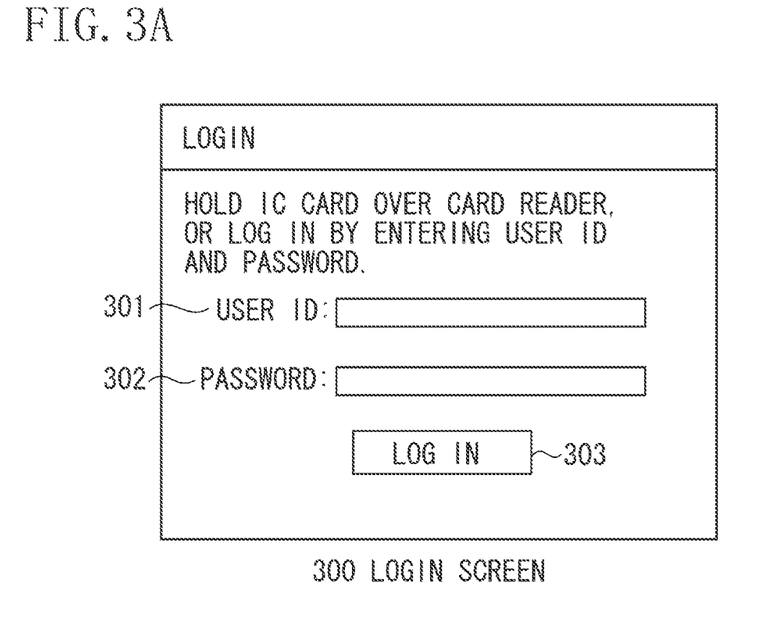
FIGS. 3A, 3B, 3C, and 3D are diagrams each illustrating a screen to be displayed by the printing apparatus.

A login screen 300 in FIG. 3A is a screen displayed by the operation unit 208 of the printing apparatus 100. When activation of the printing apparatus 100 is completed, the operation unit 208 initially displays the login screen 300. The user holds the user's IC card over the IC card reader 209 to authenticate the user. When the authentication is successful, the user is logged into the printing apparatus 100 and can use functions of the printing apparatus 100. The authentication process can also be executed without using the IC card reader 209. In this case, the user inputs a user ID and a password into an entry field 301 and an entry field 302, respectively, and then presses a login button 303. When the authentication is successful, the operation unit 208 displays a menu screen 310 illustrated in FIG. 3B. When the authentication fails, the operation unit 208 notifies the user of the authentication failure without displaying the menu screen 310.

Figure 3B:
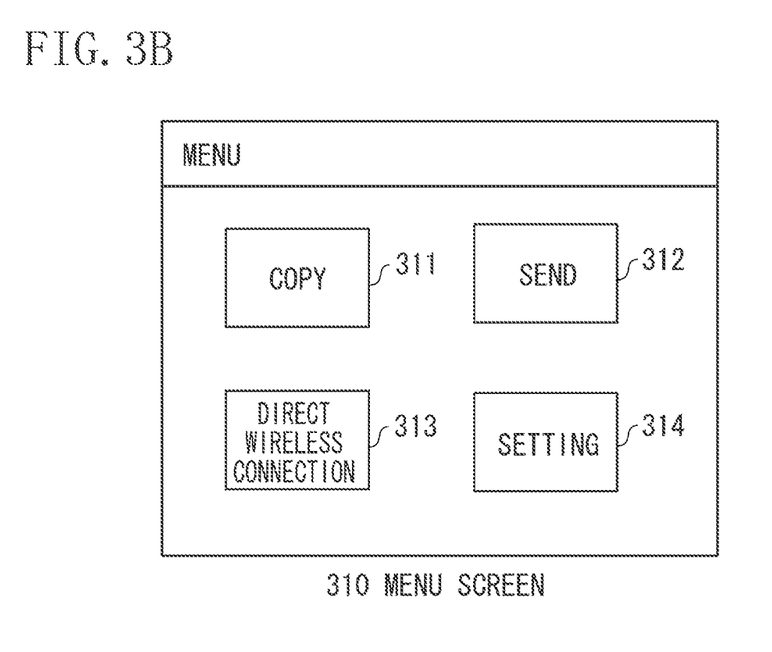

Buttons for the user to use functions provided by the printing apparatus 100 are displayed on the menu screen 310. A button 311 is provided for the user to use a copy function. When the user presses the button 311, the operation unit 208 displays a copy screen (not illustrated).

A button 312 is provided for the user to use a SEND function, which is a function of transmitting an original document image generated by the scanner 207 to an external apparatus. When the user presses the button 312, the operation unit 208 displays a SEND screen (not illustrated).

A button 314 is provided for the user to perform device setting of the printing apparatus 100. When the user presses the button 314, the operation unit 208 displays a setting screen (not illustrated).

A button 313 is provided for the user to use the access point mode. To use the access point mode, the user first presses the button 313. When the user presses the button 313, the operation unit 208 displays a wireless connection screen 320 illustrated in FIG. 3C.

Figure 3C:
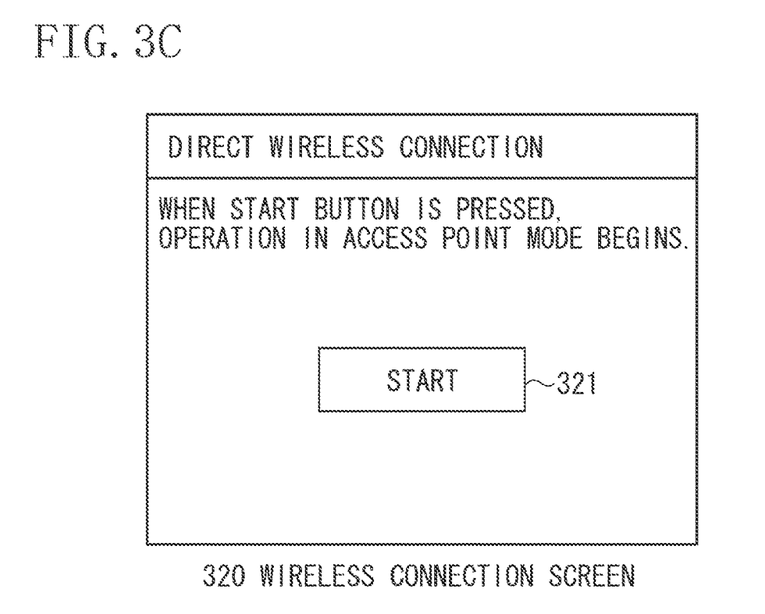

A start button 321 is displayed on the wireless connection screen 320. The start button 321 is provided for the user to instruct the printing apparatus 100 to start the operation in the access point mode. When the user presses the start button 321, the printing apparatus 100 starts the operation in the access point mode. The operation unit 208 then displays a wireless connection screen 330 illustrated in FIG. 3D.

Figure 3D:
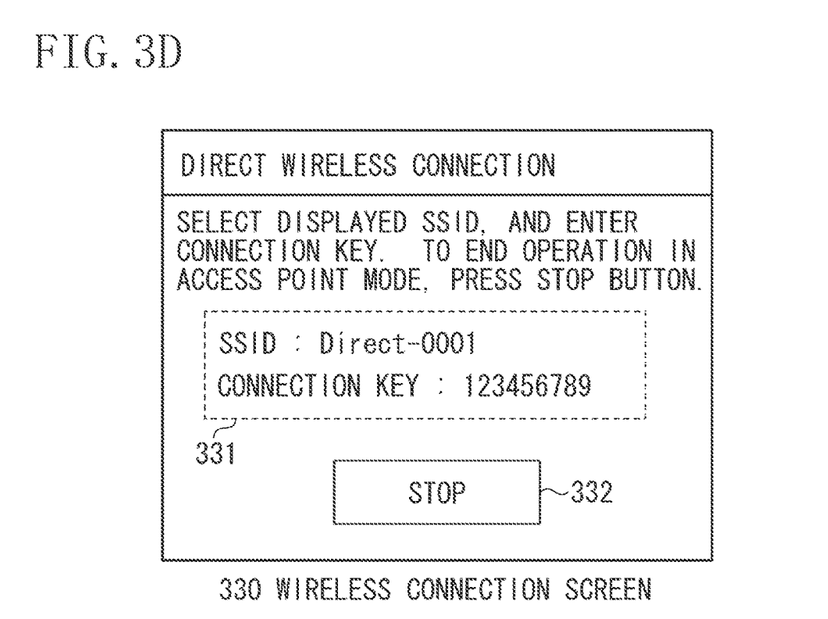

When the printing apparatus 100 operates in the access point mode, the printing apparatus 100 generates a service set identifier (SSID) and a connection key (e.g., a Wired Equivalent Privacy (WEP) key). The SSID and the connection key generated by the printing apparatus 100 are displayed in an area 331 of the wireless connection screen 330. The SSID generated herein can be a random SSID, e.g., a one-time SSID or the same SSID can be generated on each occasion, e.g., a fixed SSID.

Upon confirming the information displayed in the area 331, the user searches for access points in the user's vicinity using the user's mobile terminal 102, and selects an SSID corresponding to the SSID displayed in the area 331 from a search result list. The user then inputs the connection key displayed in the area 331 into the mobile terminal 102, thereby creating a wireless connection, based on the access point mode, between the printing apparatus 100 and the mobile terminal 102.

Upon wirelessly connecting the mobile terminal 102 to the printing apparatus 100 using the access point mode, the user, for example, selects a picture on the mobile terminal 102 to be printed. When the user inputs a print instruction into the mobile terminal 102, the mobile terminal 102 transmits print data to the printing apparatus 100 using wireless communication in the access point mode. The mobile terminal 102 adds the character string "Mobile" to the print data as information indicating the job owner.

A stop button 332 is displayed on the wireless connection screen 330. The stop button 332 receives a stop instruction for stopping the operation in the access point mode from the user. To stop the operation of the printing apparatus 100 in the access point mode, the user presses the stop button 332. During the operation of the printing apparatus 100 in the access point mode, power consumption of the printing apparatus 100 increases. Therefore, it is desirable for the user to press the stop button 332 to stop using the access point mode.

Figure 4:
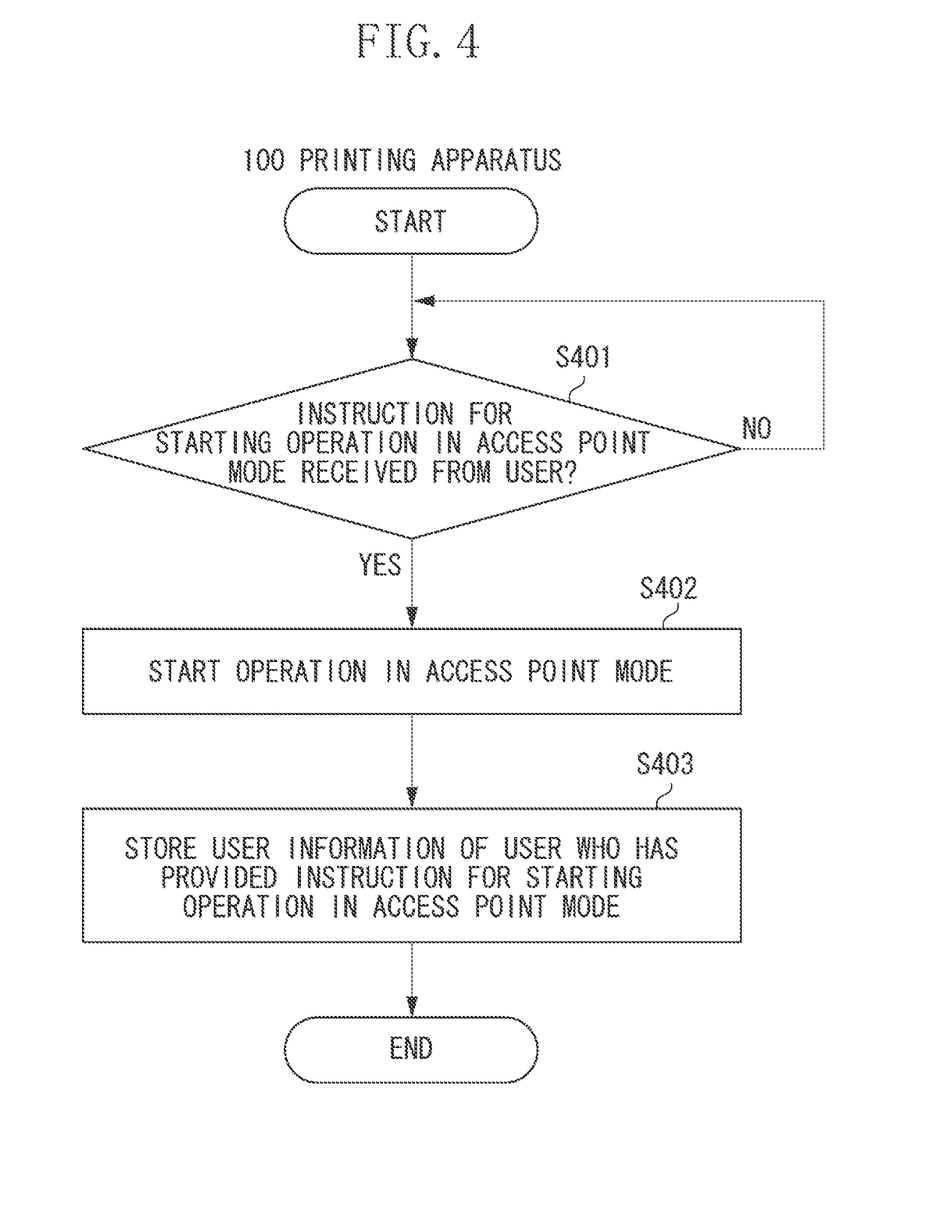
FIG. 4 is a flowchart illustrating processing to be executed when the printing apparatus starts operation in an access point mode.

Next, processing to be executed by the printing apparatus 100 at the start of the operation in the access point mode will be described with reference to a flowchart illustrated in FIG. 4. The CPU 201 loads a control program, which is stored in a memory such as the ROM 202, into the RAM 203 and executes the control program, thereby performing each step in the flowchart illustrated in FIG. 4.

First, in step S401, the CPU 201 determines whether an instruction for starting the operation in the access point mode has been received from a user. In the present exemplary embodiment, when the user presses the start button 321 on the wireless connection screen 320 illustrated in FIG. 3C, the CPU 201 determines that an instruction for starting the operation in the access point mode has been received from the user (Yes in step S401). The processing then proceeds to step S402.

In step S402, the CPU 201 starts the operation in the access point mode. The CPU 201 generates an SSID and a connection key, and controls the wireless LAN I/F 205 to operate in the access point mode. When the wireless LAN I/F 205 starts the operation in the access point mode, the CPU 201 controls the operation unit 208 to display the wireless connection screen 330 illustrated in FIG. 3D.

Next, in step S403, the CPU 201 identifies the user who has provided the instruction for starting the operation in the access point mode, and stores user information (e.g., a user ID) about the identified user in the RAM 203. In the present exemplary embodiment, the CPU 201 identifies a user logged in to the printing apparatus 100 when the instruction for starting the operation in the access point mode is received as the user who has provided the instruction for starting the operation in the access point mode. The CPU 201 then stores the user information about this user in the RAM 203. For example, in a case where the printing apparatus 100 starts the operation in the access point mode based on the instruction of the user, and a user logged in to the printing apparatus 100 at this moment is "Yamada", the CPU 201 stores user information "Yamada" in the RAM 203.

Figure 5:
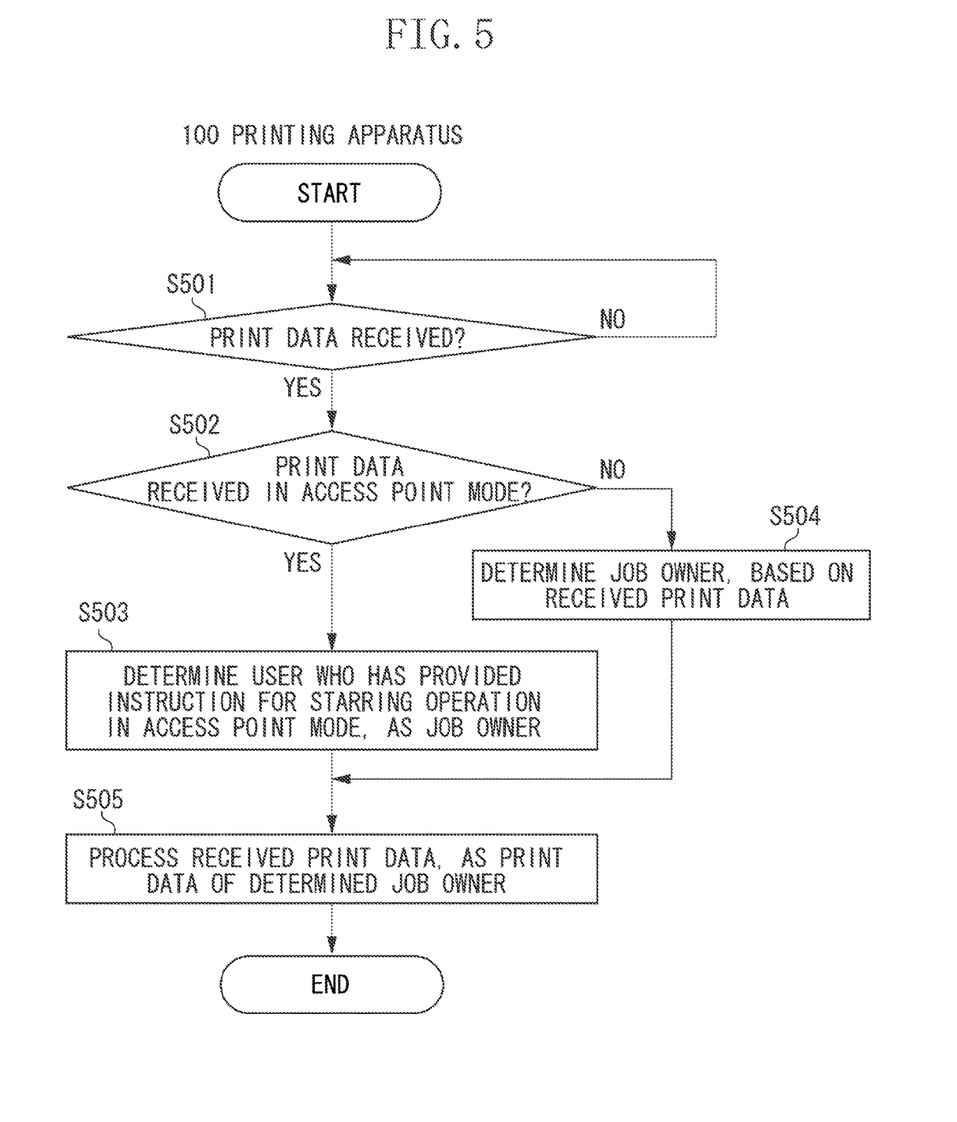
FIG. 5 is a flowchart illustrating processing to be executed when the printing apparatus receives print data.

As will be described in detail below with reference to FIG. 5, the CPU 201 determines the user indicated by the user information stored in step S403 as the job owner of print data received in the access point mode. When the printing apparatus 100 stops the operation in the access point mode, the CPU 201 deletes the user information stored in step S403.

Next, processing to be executed when the printing apparatus 100 receives print data will be described with reference to a flowchart illustrated in FIG. 5. The CPU 201 loads a control program, which is stored in a memory such as the ROM 202, into the RAM 203 and executes the control program, thereby performing each step in the flowchart illustrated in FIG. 5.

First, in step S501, the CPU 201 determines whether print data has been received by the printing apparatus 100. The printing apparatus 100 receives print data from an external apparatus, such as the PC 101 or the mobile terminal 102, by using the network I/F 210 or the wireless LAN I/F 205. When the CPU 201 determines that print data has been received (Yes in step S501), the processing proceeds to step S502.

Next, in step S502, the CPU 201 determines whether the print data has been received through wireless communication in the access point mode. The CPU 201 performs this determination by confirming a destination Internet Protocol (IP) address of the print data. An IP address used by the printing apparatus 100 in the access point mode is different from an IP address used in the infrastructure mode and the wired LAN. Therefore, in a case where the destination IP address of the print data matches with the IP address used by the printing apparatus 100 in the access point mode, the CPU 201 can determine that the print data has been received through the wireless communication in the access point mode. In a case where the destination IP address of the print data does not match with the IP address used by the printing apparatus 100 in the access point mode, the CPU 201 can determine that the print data has been received in the infrastructure mode or the wired LAN. The CPU 201 can determine whether the print data has been received through the wireless communication in the access point mode based on, for example, a destination port number of the print data, without being limited to use of the destination IP address of the print data.

When the destination IP address of the print data matches with the IP address used by the printing apparatus 100 in the access point mode (Yes in step S502), the CPU 201 determines that the print data has been received through the wireless communication in the access point mode. The processing then proceeds to step S503. When the destination IP address of the print data does not match with the IP address used by the printing apparatus 100 in the access point mode (No in step S502), the CPU 201 determines that the print data has not been received through the wireless communication in the access point mode. The processing then proceeds to step S504.

In step S504, the CPU 201 determines, based on the received print data, the job owner of the received print data. As part of generating and transmitting a print job (print data), information indicating a job owner is added to the print data. For example, when the information added to the print data is "Tanaka", the CPU 201 determines that the job owner of the received print job is "Tanaka".

Next, in step S503, the CPU 201 determines the user who has provided the instruction for starting the operation in the access point mode as the job owner of the received print data. The user who has provided the instruction for starting the operation in the access point mode is the user indicated by the user information stored in the RAM 203 in step S403 in FIG. 4. For example, if the user information about the user "Yamada" is stored in the RAM 203 in step S403 in FIG. 4, the CPU 201 determines that the job owner of the received print data is "Yamada".

The process in step S503 is executed when the printing apparatus 100 receives the print data through the wireless communication in the access point mode. In many cases, an apparatus transmitting print data to the printing apparatus 100 using the access point mode is expected to be a mobile terminal. In those cases, as briefly described above, model information of the mobile terminal or a character string "Mobile" is added to the print data transmitted by the mobile terminal, and the printing apparatus 100 cannot determine the job owner from this information. Therefore, in the present exemplary embodiment, the printing apparatus 100 regards the user who has provided the instruction for starting the operation in the access point mode in the access point mode as the job owner of the received print data.

Next, in step S505, the CPU 201 processes the received print data as the print data of the determined job owner. Three patterns will be described as specific examples of the processing executed in step S505.
(Pattern 1)

Processing for switching between permission and prohibition of print execution by using the information about the determined job owner will now be described. Permission/prohibition of print execution is set beforehand, for each user, in the printing apparatus 100. In step S505, the CPU 201 determines whether the determined job owner is a user for whom the print execution is prohibited. When the determined job owner is a user for whom the print execution is permitted, the CPU 201 executes the print process based on the received print data. When the determined job owner is a user for whom the print execution is prohibited, the CPU 201 rejects the received print data without executing the print process based on the received print data.
(Pattern 2)

Figure 6A:
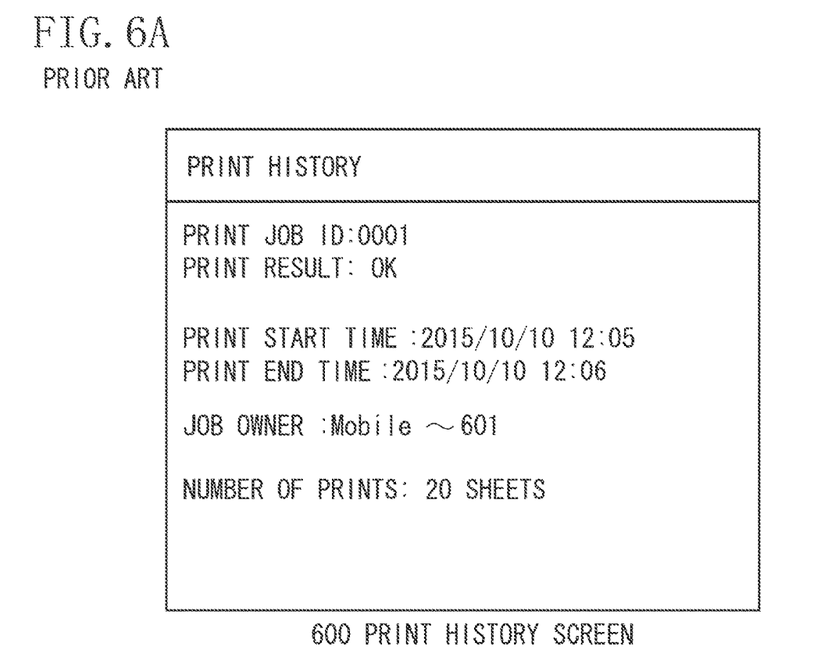
FIG. 6A is a diagram illustrating a print history screen according to prior art.

Processing for executing the print process based on the received print data and storing a print history will now be described. In a conventional printing apparatus, when print data is received through wireless communication in an access point mode, a job owner in a print history is "Mobile". A print history screen 600 in FIG. 6A is a screen displayed by the conventional printing apparatus. According to an item 601, the job owner is "Mobile".

Figure 6B:
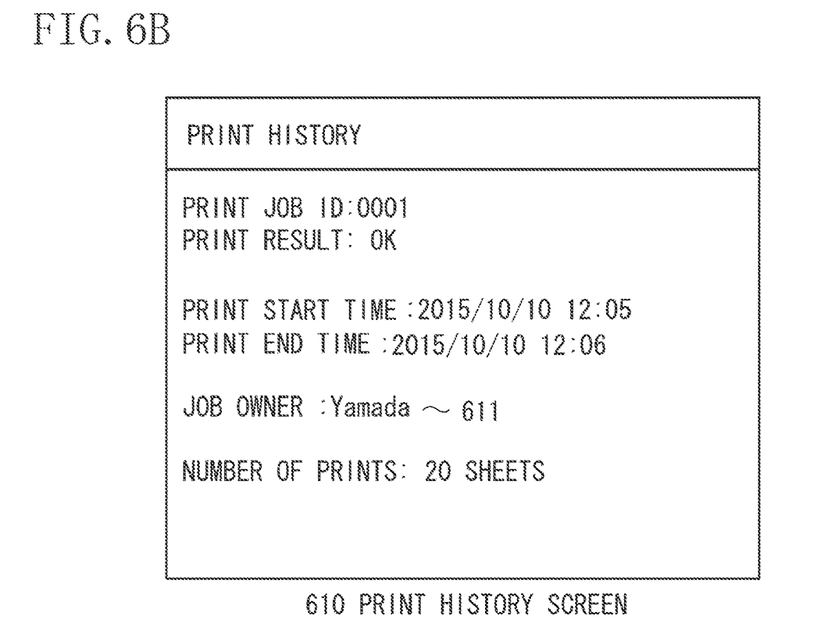
FIG. 6B is a diagram illustrating a print history screen according to an exemplary embodiment.

A print history screen 610 in FIG. 6B is a screen displayed by the printing apparatus 100 to which the processing according to the present exemplary embodiment is applied. When the printing apparatus 100 receives the print data through the wireless communication in the access point mode, the CPU 201 determines the user who has provided the instruction for starting the operation in the access point mode, as the job owner (step S503). Therefore, instead of "Mobile", the name of the user, such as "Yamada", can be displayed as an item 611, i.e., as the job owner in the print history.
(Pattern 3)

Figure 7A:
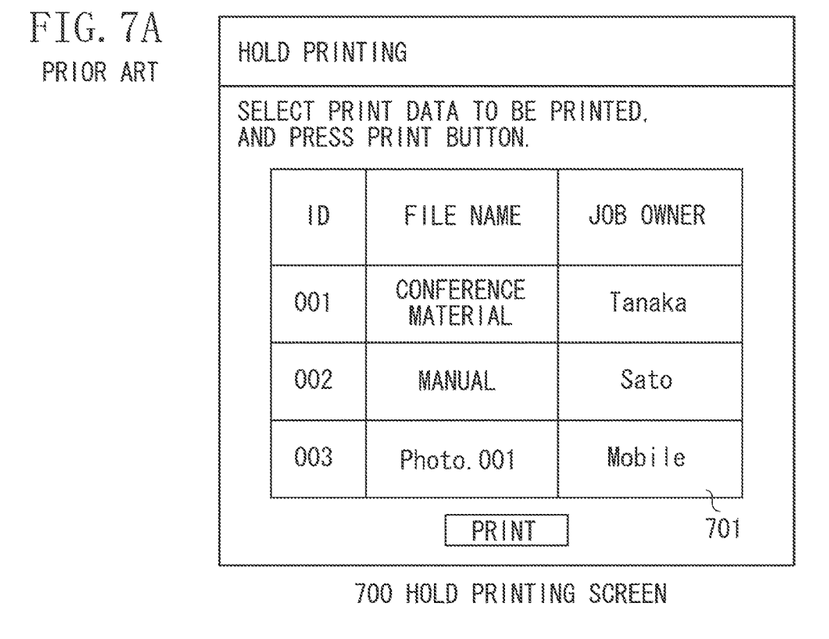
FIG. 7A is a diagram illustrating a hold printing screen according to prior art.

Processing for temporarily holding the received print data without immediately performing printing, i.e., processing for storing the print data in the HDD 204 and executing the print process upon receipt of a print instruction from the user, will now be described. In a conventional printing apparatus, when print data is received through wireless communication in an access point mode and then held, the job owner of the held print data, i.e., print data waiting for a print instruction from a user is "Mobile". A hold printing screen 700 in FIG. 7A is a screen displayed by the conventional printing apparatus. According to an item 701, the job owner is "Mobile".

Figure 7B:
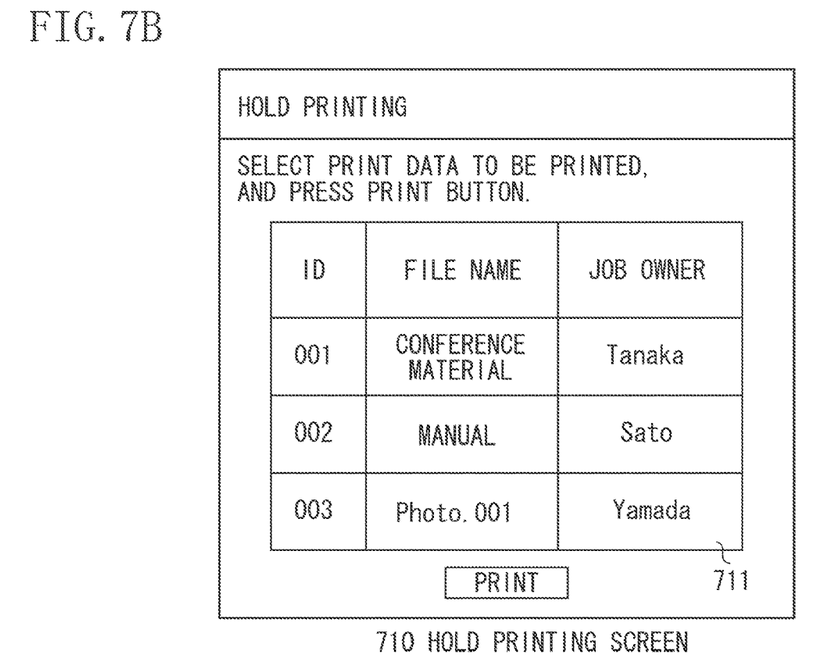
FIG. 7B is a diagram illustrating a hold printing screen according to an exemplary embodiment.

A hold printing screen 710 in FIG. 7B is a screen displayed by the printing apparatus 100 to which the processing of the present exemplary embodiment is applied. When the printing apparatus 100 receives the print data through the wireless communication in the access point mode, the CPU 201 determines the user who has provided the instruction for starting the operation in the access point mode as the job owner (step S503). Therefore, instead of "Mobile", the name of the user, such as "Yamada", can be displayed as the item 711, i.e., as the job owner of the held print data.

According to the present exemplary embodiment, when the printing apparatus 100 receives the print data through the wireless communication in the access point mode, the printing apparatus 100 can determine the user who has provided the instruction for starting the operation in the access point mode as the job owner. Therefore, the printing apparatus 100 or the user can easily recognize the job owner, unlike in a conventional case where a job owner is indicated by model information of a mobile terminal or "Mobile".

According to the present exemplary embodiment, the printing apparatus 100 stores the user information about the user when receiving the instruction for starting the operation in the access point mode from the user (step S403). Subsequently, when receiving the print data through the wireless communication in the access point mode, the printing apparatus 100 determines the user indicated by the user information stored in step S403 as the job owner (step S503). Therefore, the user who has provided the instruction for starting the operation in the access point mode can be determined as the job owner, even if the user who has provided the instruction for starting the operation in the access point mode differs from the user logged in to the printing apparatus 100 when the print data has been received.

Next, a second exemplary embodiment will be described. In the present exemplary embodiment, a user and an SSID generated for the user are managed in association with each other, and a user corresponding to an SSID used in the access point mode is determined as a job owner based on this association. A hardware configuration of the printing apparatus 100 and screens to be displayed by the printing apparatus 100 are similar to the configuration and the screens according to the first exemplary embodiment, and thus will be not described.

Figure 8:
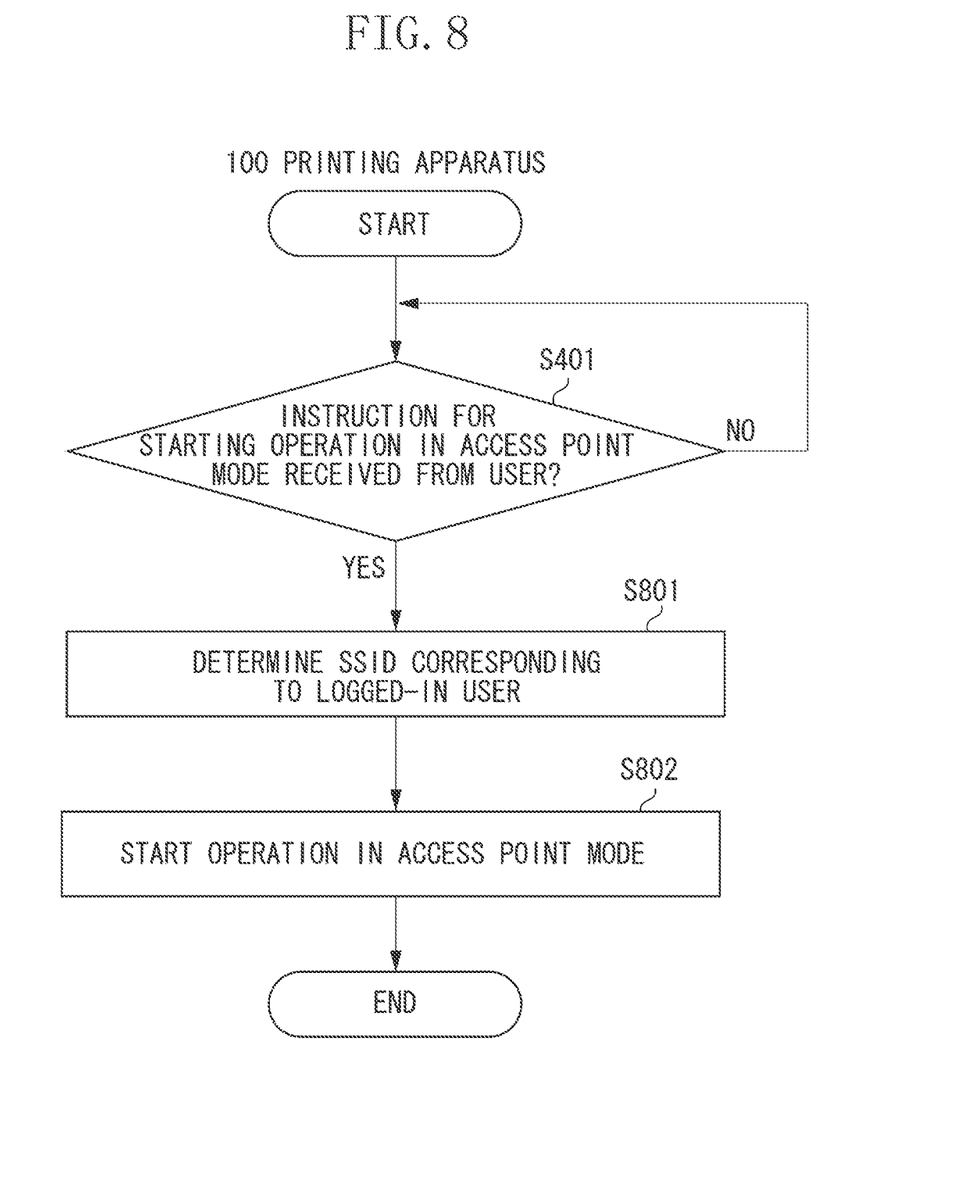
FIG. 8 is a flowchart illustrating processing to be executed when the printing apparatus starts operation in the access point mode.

Processing to be executed when the printing apparatus 100 starts the operation in the access point mode will be described with reference to a flowchart illustrated in FIG. 8. The CPU 201 loads a control program, which is stored in a memory such as the ROM 202, into the RAM 203 and executes the control program, thereby performing each step in the flowchart illustrated in FIG. 8. Among steps of the flowchart illustrated in FIG. 8, steps provided with the same numbers as the numbers of the flowchart illustrated in FIG. 4 are steps for executing processes similar to the processes described with reference to FIG. 4.

When the CPU 201 determines that an instruction for starting the operation in the access point mode has been received from a user (Yes in step S401), the processing proceeds to step S801. In step S801, the CPU 201 determines an SSID corresponding to a logged-in user.

Figure 9:
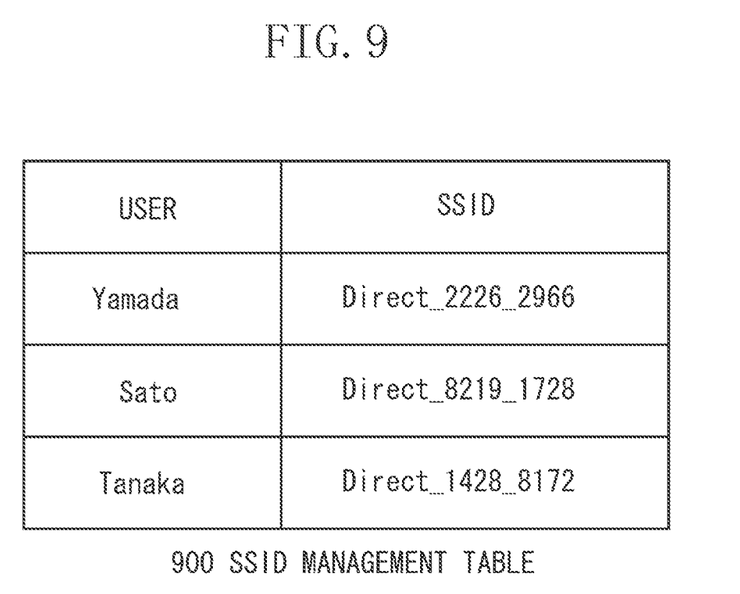
FIG. 9 is a diagram illustrating a service set identifier (SSID) management table.

In the present exemplary embodiment, an SSID to be exclusively used by a user is prepared beforehand for the user. An SSID management table 900 in FIG. 9 is a table for managing association of a user with an SSID to be used by the user. The SSID management table 900 is stored in the HDD 204. According to the SSID management table 900, for example, "Direct_2226_2966" is prepared for a user "Yamada", as an SSID to be exclusively used by the user "Yamada". This indicates that, when the user "Yamada" logs in to the printing apparatus 100 and then provides an instruction for starting the operation in the access point mode, the printing apparatus 100 starts the operation in the access point mode by using the SSID "Direct_2226_2966". In step S801, the CPU 201 determines the SSID corresponding to the logged-in user by referring to the SSID management table 900.

Next, in step S802, the CPU 201 starts the operation in the access point mode. The CPU 201 controls the wireless LAN I/F 205 to start the operation in the access point mode by using the SSID determined in step S801.

Figure 10:
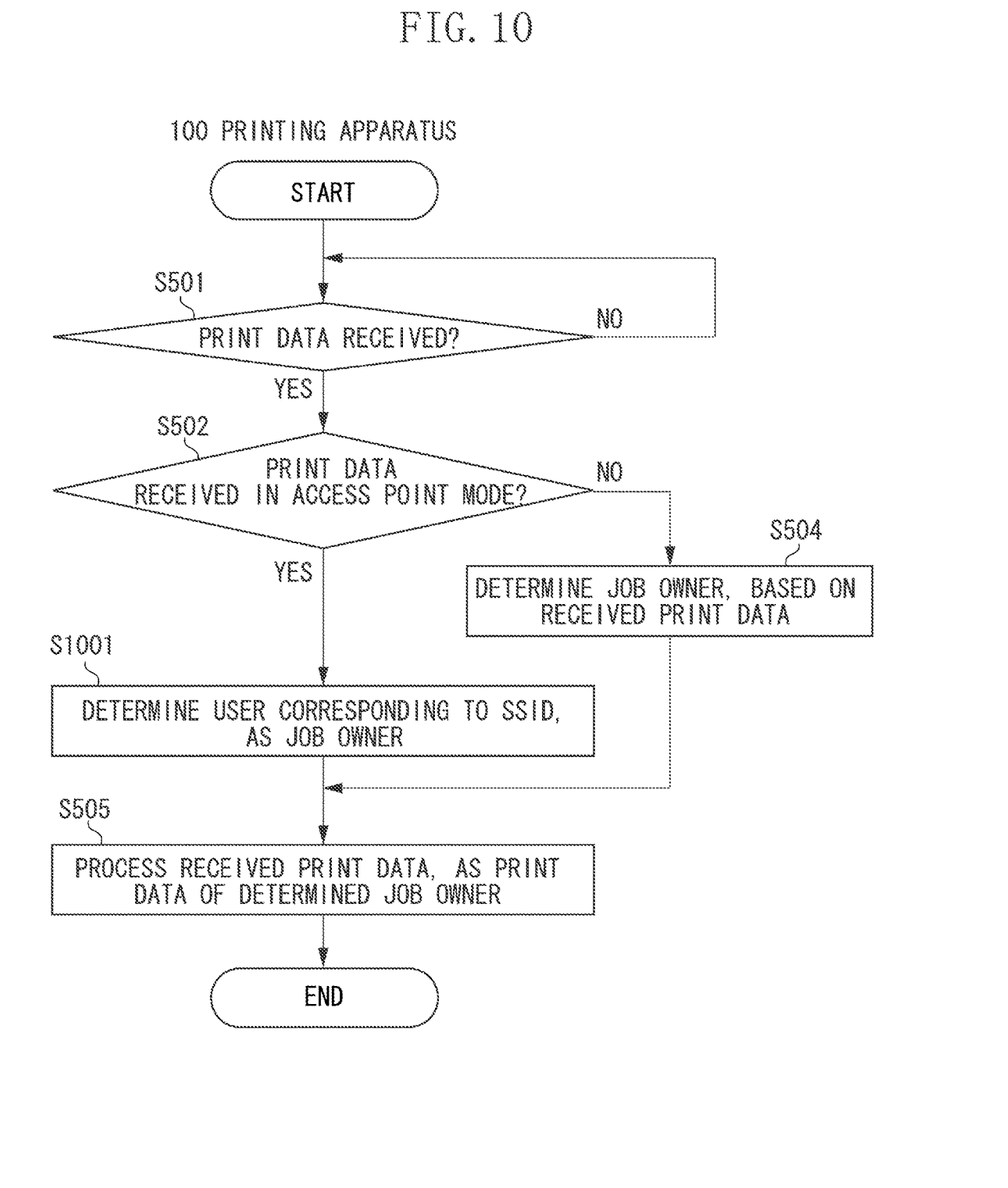
FIG. 10 is a flowchart illustrating processing to be executed when the printing apparatus receives print data.

Next, processing to be executed when the printing apparatus 100 receives print data will be described with reference to a flowchart illustrated in FIG. 10. The CPU 201 loads a control program, which is stored in a memory such as the ROM 202, into the RAM 203 and executes the control program, thereby performing each step in the flowchart illustrated in FIG. 10. Among steps of the flowchart illustrated in FIG. 10, steps provided with the same numbers as the numbers of the flowchart illustrated in FIG. 5 are steps for executing processes similar to the processes described with reference to FIG. 5.

When the CPU 201 determines that print data has been received through the wireless communication in the access point mode (Yes in step S502), the processing proceeds to step S1001. Next, in step S1001, the CPU 201 determines a user corresponding to an SSID used in the access point mode as the job owner of the received print data. For example, when the SSID used in the access point mode is "Direct_2226_2966", the CPU 201 determines "Yamada" as the job owner of the received print data by referring to the SSID management table 900.

According to the present exemplary embodiment, when the printing apparatus 100 receives the print data through the wireless communication in the access point mode, the printing apparatus 100 can determine the user corresponding to the SSID used in the access point mode as the job owner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225806, filed Nov. 18, 2015, which is hereby incorporated by reference herein in its entirety.

What is claimed is:

1. A printing apparatus comprising:
    a wireless communication interface;
    a display;
    one or more processors; and
    one or more memories storing instructions that, when executed by the one or more processors, cause the printing apparatus to perform operations comprising:
    receiving an instruction which is provided by a user via a screen displayed on the display of the printing apparatus, wherein the instruction instructs the printing apparatus to start a direct wireless function for establishing a wireless communication between the wireless communication interface of the printing apparatus and an external apparatus without intervention of a relay apparatus;
    starting the direct wireless function in response to receiving the instruction;
    identifying the user who has benn logging in to the printing apparatus when the instruction is received via the screen displayed on the of the printing apparatus;
    receiving print data via the wiereless communications established by the started direct wireless function; and
    determining the identified user as an owner of the print data which is received via the wireless communication established by the started direct wiereless function.

2. The printing apparatus according to claim 1, wherein, in a case where the printing apparatus receives other print data via a communication function different from the started direct wireless function, the determining determines an owner of the received other print data, based on information included in the received other print data.

3. The printing apparatus according to claim 2, wherein the communication function different from the direct wireless function is an infrastructure mode of a wireless local area network (LAN).

4. The printing apparatus according to claim 2, wherein the communication function different from the direct wireless function is a wired LAN communication function via a LAN cable.

5. The printing apparatus according to claim 1, wherein the started direct wireless function is an access point mode in which the wireless communication interface of the printing apparatus acts as an access point.

6. The printing apparatus according to claim 1, wherein the instructions cause the printing apparatus to further perform storing information of the identified user according to the identifying the user who has been logging in to the printing apparatus when the instruction is received via the screen displayed on the display of the printing apparatus, and
    wherein, in a case where the print data is received via the wireless communication established by the started direct wireless function, the identified user is determined as the owner of the received print data based on the stored information.

7. The printing apparatus according to claim 1, wherein the received print data is a print job, and the owner of the received print data is a job owner of the print job.

8. The printing apparatus according to claim 1, wherein the instructions cause the printing apparatus to further perform processing, as print data of the determined owner, the print data which is received via the wireless communication established by the started direct wireless function.

9. A printing apparatus comprising:
a wireless communication interface;
a display;
one or more processors; and
one or more memories storing instructions that, when executed by the one or more processors, cause the printing apparatus to perform operations comprising:
receiving an instruction which is provided by a user via a screen displayed on the display of the printing apparatus, wherein the instruction instructs the printing apparatus to start a direct wireless function for establishing a wireless communication between the wireless communication interface of the printing apparatus and an external apparatus without intervention of a relay apparatus;
determining an SSID corresponding to the user who has been logging in to the printing apparatus, at the printing apparatus, when the instruction is received via the screen displayed on the display of the printing apparatus;
starting the direct wireless function using the determined SSID in a case where the instruction is received via the screen displayed on the display of the printing apparatus;
receiving print data via the wireless comunication establsihed by the direct wireless function that was started using hte determined SSID; and
determining the user corresponding to the determined SSID as an owner of the print data which is received via the wireless communication established by the direct wireless function that was started using the determined SSID.

10. The printing apparatus according to claim 9, wherein the operations further comprise storing a management table for associating a user with an SSID to be exclusively used by the user,
wherein the SSID used in the started direct wireless function is determined based on the stored management table and the user who has been logging into the printing apparatus when the instruction is received via the screen displayed on the display of the printing apparatus.

11. The printing apparatus according to claim 9, wherein, in a case where the printing apparatus receives other print data via a communication function different from the started direct wireless function, an owner of the received other print data is determined based on information included in the received other print data.

12. The printing apparatus according to claim 11, wherein the communication function different from the direct wireless function is an infrastructure mode of a wireless LAN.

13. The printing apparatus according to claim 11, wherein the communication function different from the direct wireless function is a wired LAN communication function via a LAN cable.

14. The printing apparatus according to claim 9, wherein the started direct wireless function is an access point mode in which the wireless communication interface of the printing apparatus acts as an access point of the determined SSID.

15. The printing apparatus according to claim 9, wherein the operations further comprise:

determining a connection key of the determined SSID corresponding to the user who has been logging in to the printing apparatus when the instruction is received via the screen displayed on the display of the printing apparatus; and
displaying the determined connection key and the determined SSID on the display of the printing apparatus,
wherein the wireless communication between the wireless communication interface of the printing apparatus and the external apparatus is established by the started direct wireless function in a case where the determined connection key of the determined SSID is input on the external apparatus.

16. A control method to be executed by a printing apparatus including a wireless communication interface, the control method comprising:
receiving an instruction which is provided by a user via a screen of the printing apparatus, wherein the instruction instructs the printing apparatus to start a direct wireless function for establishing a wireless communication between the wireless communication interface of the printing apparatus and an external apparatus without intervention of a relay apparatus;
starting the direct wireless function in response to receiving the instruction;
identifying the user who has been logging in to the printing apparatus when the instruction is received via the screen of the printing apparatus;
receiving print data via the wireless communication established by the started direct wireless function; and
processing, as print data of the identified user, the print data which is received via the wireless communication established by the started direct wireless function.

17. The control method according to claim 16, further comprising:
storing, into a storage of the printing apparatus, information of the identified user who has been logging in to the printing apparatus when the instruction is received via the screen of the printing apparatus is identified,
wherein the print data, which is received via the wireless communication established by the started direct wireless function, is processed as the print data of the identified user based on the stored information.

18. The control method according to claim 16, further comprising:
receiving other print data via a communication function different from the started direct wireless function; and
determining an owner of the received other print data based on information included in the received other print data.

19. A control method to be executed by a printing apparatus including a wireless communication interface, the control method comprising:
receiving an instruction which is provided by a user via a screen of the printing apparatus, wherein the instruction instructs the printing apparatus to start a direct wireless function for establishing a wireless communication between the wireless communication interface of the printing apparatus and an external apparatus without intervention of a relay apparatus;
determining an SSID corresponding to the user who has been logging in to the printing apparatus, at the printing apparatus, when the instruction is received via the screen of the printing apparatus;
starting the direct wireless function using the determined SSID in a case where the instruction is received via the screen of the printing apparatus;

receiving print data via the wireless communication established by the direct wireless function that was started using the determined SSID; and processing, as print data of the user corresponding to the determined SSID, the print data which is received via the wireless communication established by the direct wireless function that was started using the determined SSID.

20. A printing apparatus comprising:
a wireless communication interface;
a display;
one or more processors; and
one or more memories storing instructions that, when executed by the one or more processors, cause the printing apparatus to perform operations comprising:
receiving an instruction which is provided by a user via a screen displayed on the display of the printing apparatus, wherein the instruction instructs the printing apparatus to start a direct wireless function for establishing a wireless communication between the wireless communication interface of the printing apparatus and an external apparatus without intervention of a relay apparatus;
starting the direct wireless function in response to receiving the instruction;
identifying the user who has been logging in to the printing apparatus when the instruction is received via the screen displayed on the display of the printing apparatus;
receiving print data via the wireless communication established by the started direct wireless function; and
associating the identified user with the print data which is received via the wireless communication established by the started direct wireless function.

21. A printing apparatus comprising:
a wireless communication interface;
a display;
one or more processors; and
one or more memories storing instructions that, when executed by the one or more processors, cause the printing apparatus to perform operations comprising:
receiving an instruction which is provided by a user via a screen displayed on the display of the printing apparatus, wherein the instruction instructs the printing apparatus to start a direct wireless function for establishing a wireless communication between the wireless communication interface of the printing apparatus and an external apparatus without intervention of a relay apparatus;
determining an SSID corresponding to the user who has been logging in to the printing apparatus when the instruction is received via the screen displayed on the display of the printing apparatus;
starting the direct wireless function using the determined SSID in a case where the instruction is received via the screen displayed on the display of the printing apparatus;
receiving print data via the wireless communication established by the direct wireless function that was started using the determined SSID; and
associating the user corresponding to the determined SSID with the print data which is received via the wireless communication established by the direct wireless function that was started using the determined SSID.

* * * * *